United States Patent [19]
Heikinheimo

[11] 3,756,297
[45] Sept. 4, 1973

[54] METHOD AND APPARATUS FOR TRIMMING TIMBER
[75] Inventor: Olli Heikinheimo, Helsinki, Finland
[73] Assignee: Plan-Sell Oy, Helsinki, Finland
[22] Filed: Apr. 22, 1971
[21] Appl. No.: 136,362

[30] Foreign Application Priority Data
Apr. 28, 1970 Finland.............................. 1198/70

[52] U.S. Cl......................... 144/312, 83/35, 83/732
[51] Int. Cl......................... B27b 5/04, B27b 25/04
[58] Field of Search............ 144/312, 309 R, 326 R, 144/309; 143/49 R, 49 A, 49 B, 49 C, 49 D, 49 F; 83/35, 732

[56] References Cited
UNITED STATES PATENTS
3,565,140  2/1971  Jacobsen............................. 144/312

Primary Examiner—Donald R. Schran
Attorney—Cushman, Darby & Cushman

[57] ABSTRACT

Pieces of timber are conveyed in their transversal direction, placed longitudinally in a selected position for the cutting of the butt end, and then transferred in the direction of the top end to a selected position for the trimming of the top end. After the cutting of the butt end the piece of timber is moved in the direction of the top end against a selectively chosen stop, which is at such a distance from the cutting line of the top end trimming saw as corresponds to the desired full multiple of the linear measuring unit to be cut off the top end plus the greatest trimming margin, whereafter the piece of timber is moved, before arriving at the top end trimming saw, back in the direction of the butt end against a selectively chosen stop, which is at such a distance from the cutting line of the top end trimming saw as corresponds to the length of the piece of timber given in full linear measuring units minus the said full multiple of the linear measuring unit to be cut off the top end.

2 Claims, 3 Drawing Figures

METHOD AND APPARATUS FOR TRIMMING TIMBER

BACKGROUND OF THE INVENTION

1. Field of the Invention

The invention relates to the field of trimming timber on conveyor tables.

2. Description of the Prior Art

Nowadays timber is usually assorted and trimmed on conveyor tables, the main elements of which are chains provided with grippers for conveying timber in the transversal direction, organs for moving timber longitudinally in the direction of its ends, and cutting saws for trimming the butt and top ends of timber. One applicable normal method is that the butt end trimmer places a piece of timber into each gap between the grippers in the proper position in relation to the butt end cutting saw. After the cutting of the butt end, the piece of timber is moved over the trimming table in the direction of the top end by the transferring organs in order to place the top end in the proper position in relation to the top end cutting blade on the basis of the assorting. Nowadays this placement takes place so that the assorter is at the same time top end cutter who places a piece of timber by hand in the proper position for the trimming of the top end, or the timber is moved over the table mechanically by pushing organs affecting the butt end for the trimming of the top end; in the latter case the grippers are released from their pushing position by an electric magnet or the like on orders of an impulse given by the assorter when the piece of timber has arrived in the proper position in relation to the top end cutting line. The former method is time-consuming, and the assorter cannot obtain a good general view of the timber, since he has to watch it from too close. Due to its complicated mechanism, the latter method is prone to disturbances, the elimination of which substantially diminishes the effectiveness of the assorting plant.

SUMMARY OF THE INVENTION

According to the invention there is provided a new and useful method of trimming timber comprising the steps of conveying pieces of timber in their transversal direction, placing same longitudinally in a selected position, cutting the butt end of each piece of timber in said selected position, then transporting the piece of timber in the direction of the top end thereof against a selectively chosen stop at such a distance from the cutting line of a top end trimming saw as corresponds to the desired full multiple of a linear measuring unit to be cut off the top end plus the greatest trimming margin, thereafter the piece of timber is transferred back in the direction of the butt end against another selectively chosen stop at such distance from the cutting line of the top end trimming saw as corresponds to the length of the piece of timber given in full linear measuring units minus the full multiple of the linear measuring unit to be cut off the top end, then transferring the piece of timber in the transversal direction thereof to the top end trimming saw, cutting the top end of the piece of timber in the top end trimming saw, and removing the trimmed timber.

The method according to the invention can be varied so that all the pieces of timber are moved, after the cutting of the butt end, against the same stop — the distance of the stop from the cutting line of the top end trimming saw corresponds to the greatest full multiple of the linear measuring unit to be cut off the top end plus the trimming margin — whereafter a piece of timber is moved, before arriving at the top end trimming saw, back in the direction of the butt end against a selectively chosen stop — the distance of the stop from the cutting line of the top end trimming saw corresponds to the length of the piece of timber given in full linear measuring units minus the full multiple of the linear measuring unit to be cut off the top end.

The invention also provides a better apparatus for trimming timber than heretofore and having a conveyor table for moving the pieces of timber in their transversal direction, a butt end cutting saw on one side of the conveyor table, transferring organs for moving the pieces of timber, after the cutting saw, in their longitudinal direction to the opposite side of the conveyor table, and a top end trimming saw situated on this opposite side directly after the transferring organ. On the opposite side of the conveyor table there is, in connection with the transferring organ, a group of stops which are situated outside the top end trimming saw at intervals of the linear measuring unit so that the first stop in the moving direction is at the distance of the greatest trimming margin or the linear measuring unit plus the greatest trimming margin from the top end trimming saw, and which can, according to the given impulse, be selectively brought from a position of rest to a position of action in order to stop the piece of timber moved by the transferring organ. In the moving direction of the conveyor table, after the said stops and on the opposite side of the top end trimming saw in relation to the stops, there is further, in connection with other transferring organs, another group of stops, which are situated at distances of full multiples of the linear measuring unit from the top end trimming saw, and which can be selectively brought, according to the given assorting impulse, in front of pieces of timber moved by the other transferring organs to stop the pieces of timber at the desired position for the trimming of the top ends.

In one advantageous application of the device each stop of the first group comprises an endless chain, which is parallel to the chains of the conveyor table and moves synchronically with them, and which has been provided with several stop plates; these plates, which are distributed along the endless chain and which have been attached with bearings so that they can turn, normally stay in a position of rest below the level of the chains of the conveyor table but can be made to synchronize with the guide by the given assorting impulse, in which case the guide keeps the stop plates in the position of action above the level of the chains of the conveyor table.

The stops of the second group can be similar to the stops of the first group, or they can be lever arms which have been attached with bearings so that they can turn, and which are pressed down by the weight of a piece of timber moved by the conveyor table, in which case the first stop left outside the piece of timber remains in the position of action stopping the piece of timber moved by the transferring organ.

DESCRIPTION OF THE PREFERRED EMBODIMENTS

Figure 1:
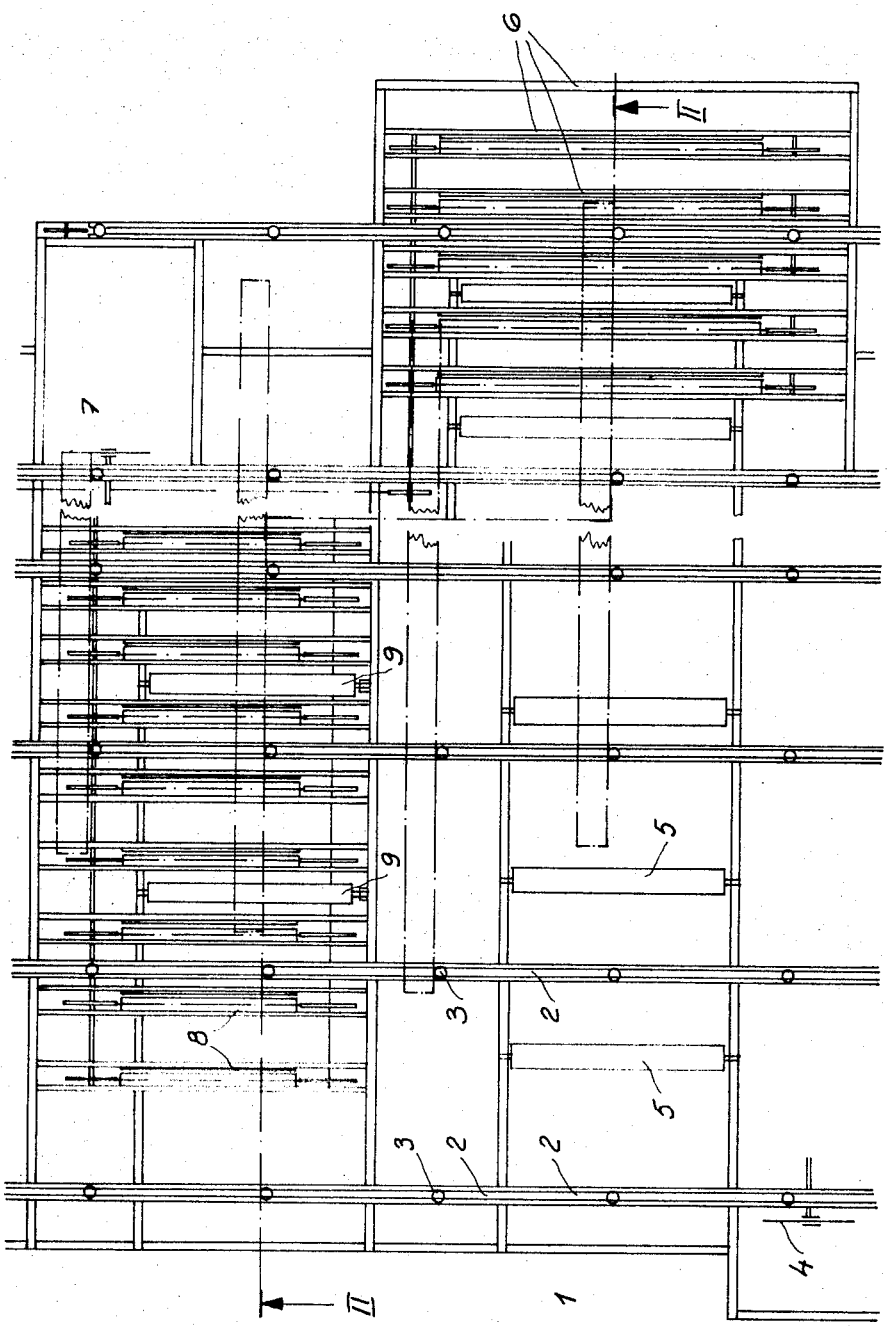
FIG. 1 shows a trimming plant seen from the top.
Figure 2:
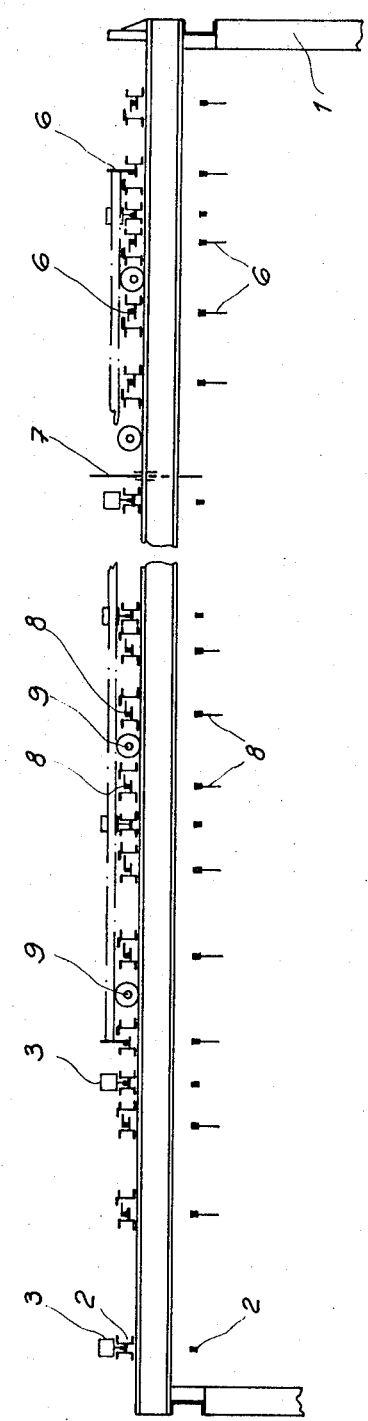
FIG. 2 is a cross section along line II in FIG. 1.

In FIG. 1 number 1 refers to the frame of the assorting and trimming table, which supports several conveyor chains 2; the moving direction of the chains in the drawing is upward and the chains have been provided with grippers 3 situated at equal intervals. It can be advantageous for the grippers to be rollers which have been attached with bearings so that they rotate freely. On the left side of the table 1, 2 in FIG. 1 there is the butt end cutting saw 4. In the moving direction of the conveyor chains 2 after the cutting saw 4 there are transferring rollers 5 which feed pieces of timber to the right. A group of stops 6, which are outside the top end trimming saw 7, have been fitted on the right side of the assorting and trimming table 1, 2 in line with the transporting rolls 5. One possible structure of the stops is described below in more detail in connection with FIG. 3. The stops 6 are situated at intervals of the linear measuring unit used in the trimming, in which case their distances from the top end trimming saw 7 correspond to full multiples of the linear measuring unit plus the greatest trimming margin, the latter being advantageously smaller than the linear measuring unit. The system can, however, just as well be that the trimming margin is the same as the linear measuring unit, in which case the stops 6 are situated at distances of full multiples of the linear measuring unit from the top end trimming saw 7. The outermost stop 6 is advantageously a stationary stop supported by the frame 1. After the stops 6, in the moving direction of the conveyor chains 2, there is another group of stops 8, which are situated on the opposite, or inner side of the top end trimming saw 7 in relation to stops 6, at intervals of the linear measuring unit and at the same time at distances of full multiples of the linear measuring unit from the top end trimming saw 7. In the area of stops 8 the drawing shows transferring rollers 9 which feed timber to the left. Stops 8 can be structurally similar to stops 6, but they can also be, for example, lever arms which have been attached with bearings so that they turn, the free ends of which are situated before the transferring rollers 9, and which have been fitted so that they are pressed down by a piece of timber moved by the conveyor chains 2. In this case the first stop not hit by the timer is left in the standing position, and the transferring rollers 9 feed the piece of timber against it.

Figure 3:
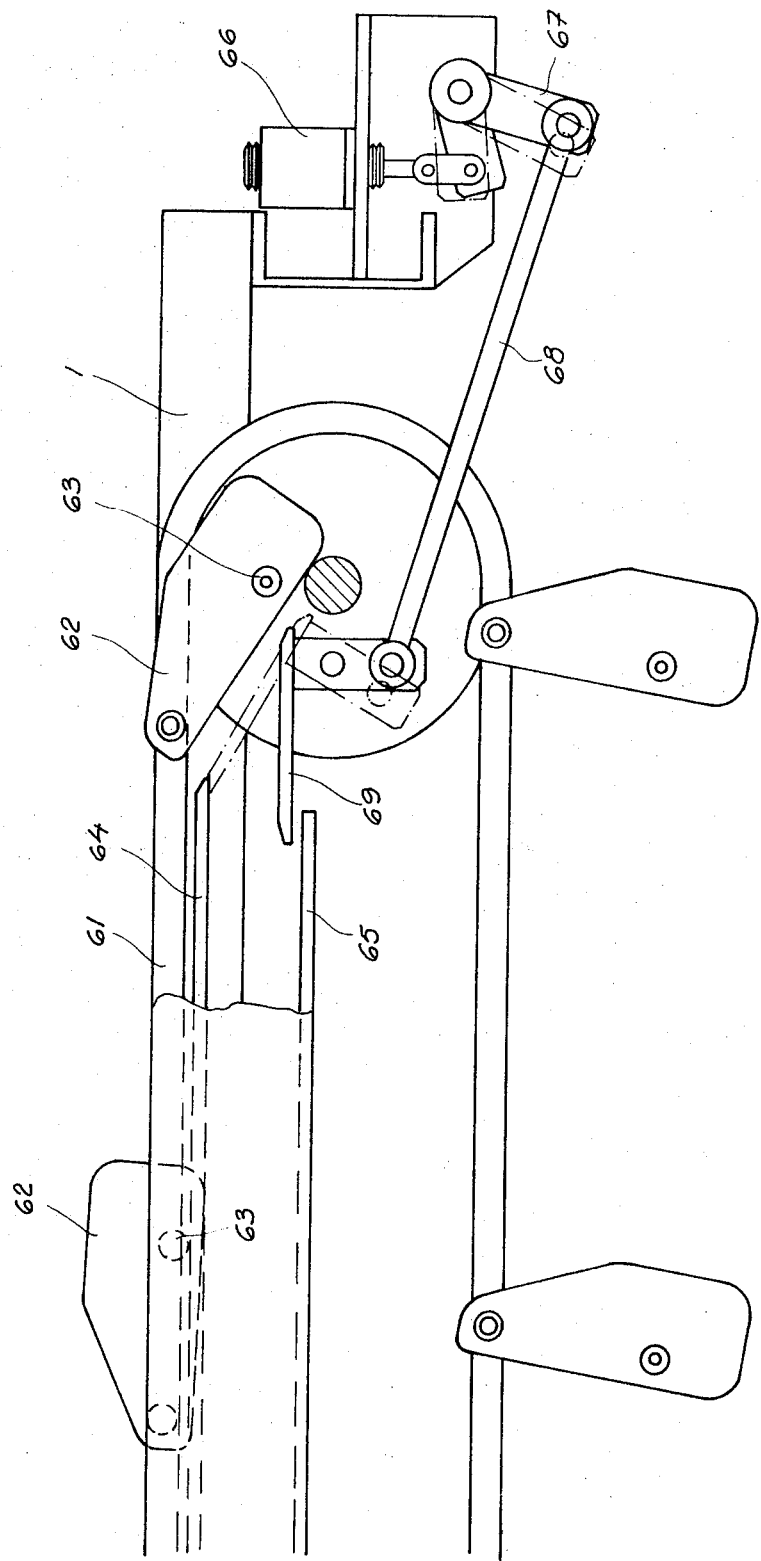
FIG. 3 shows the structure of the stop organ on a larger scale.

FIG. 3 illustrates the structure of stops 6. Each stop 6 comprises an endless conveyor chain 61, the upper course of which is approximately on the same level as the upper level of the assorting and trimming table 1, 2. Conveyor chain 61 moves at the same speed as conveyor chains 2, and has been provided with stop plates 62 at equal intervals; the stop plates have been attached with bearings so that they can turn and provided with guide rollers 63. The guide pin 63 co-operates with the upper guide 64 and the lower guide 65, which have been placed in connection with the conveyor chain 61 and are parallel to it. Depending on which guide 64 or 65 the guide pin 63 co-operates with, the stop plate 62 thus moves, either in the position shown in the upper left-hand corner of the figure, which stops a piece of timber, along the upper guide 64, or along the lower guide 65, in which case the stop plate 62 remains below the upper course of the conveyor chain 61 and the piece of timber can freely move over it. This operation is controlled by an electric magnet 66. The magnet 66 affects the flap organ 69, which has been attached with bearings so that it can turn, through an angular lever arm 67 and an articulated arm 68 so that when the magnet 66 pulls, under the influence of the assorting impulse, the flap organ 69 turns in the position indicated by dotted lines, in which case the stop plates 62 are guided along it onto the upper guide 64. When the flap organ 69 is in the position indicated by full lines, the stop plates are guided onto the lower guide 65.

Operation:

The assorter, who is advantageously situated above the table 1, 2, verifies, either after or before the cutting of the butt end, how many full linear measuring units have to be cut off the top end in addition to the trimming margin in order to obtain timber of the desired length, and pushes the respective button on the control table. The impulse then begins to proceed, in a known way, synchronically with the moving of the piece of timber concerned. When the piece of timber has arrived at the transferring rollers 5, the electric magnet 66 of the chosen stop 6 receives an impulse at which time the stop plates 62 are brought to the stopping position and the piece of timber stops against them. In connection with the assorting, the length of the piece of timber has also been verified automatically by, for example, sensory organs or light cells, and the memory of the device has received a corresponding impulse. The memory carries out the calculation automatically on the basis of the impulses received and thus chooses the stop 8 that must be brought to a stopping position synchronically with the moving of the piece of timber. When the piece of timber thus arrives at the transferring rollers 9, they move it against the selected stop 8, in which case the top end trimming saw thus cuts exactly the determined number of full linear measuring units plus the real trimming margin off the top end, and the desired length of the timber is obtained in full linear measuring units.

If stops 8 are not similar to stops 6 but such as described above, the piece of timber itself selects the proper stop.

What is claimed is:

1. A method of automatically trimming timber, comprising: conveying pieces of timber in their transversal direction, placing same longitudinally in a selected position, cutting the butt end of each piece of timber in said selected position, then transporting the piece of timber in the direction of the top end thereof against a selectively chosen stop at such a distance from the cutting line of a top end trimming saw as corresponds to the desired full multiple of a linear measuring unit to be cut off the top end plus the greatest trimming margin, thereafter the piece of timber is transferred back in the direction of the butt end against another selectively chosen stop at such distance from the cutting line of the top end trimming saw as corresponds to the length of the piece of timber given in full linear measuring units minus the full multiple of the linear measuring unit to be cut off the top end, then transferring the piece of timber in the transversal direction thereof to the top end trimming saw, cutting the top end of the piece of timber in the top end trimming saw, and removing the trimmed timber.

2. A method of automatically trimming timber, comprising: conveying pieces of timber in their transversal direction, placing the pieces longitudinally in a selected position, cutting the butt end of each piece of timber in its selected position, then transporting all the pieces against a stop mounted at such a distance from the cutting line of a top end trimming saw as corresponds to the greatest full multiple of the linear measuring unit to be cut off the top ends plus the greatest trimming margin, thereafter each piece of timber is transferred back in the direction of the butt end thereof against a selectively chosen stop at such a distance from the cutting line of a top end trimming saw as corresponds to the length of timber given in full linear measuring units minus the desired full multiple of the linear measuring unit to be cut off the top end, then transferring each piece in its transversal direction to the top end trimming saw, cutting the top end, and discharging the trimmed timber.

* * * * *